United States Patent [19]

Jego et al.

[11] Patent Number: 4,776,817
[45] Date of Patent: Oct. 11, 1988

[54] DEVICE FOR ESTABLISHING A DISCONNECTABLE ELECTRIC CONNECTION BETWEEN A FIXED FLAT CONDUCTOR AND AN OMNIBUS BAR AND A CURRENT TAPPING AND DISCONNECTION BLOCK COMPRISING A PLURALITY OF SUCH DEVICES

[75] Inventors: Gérard Jego, Brazey en Plaine; Jean-Pierre Thierry, Couternon; Serge Verdenne, Marcilly sur Tille, all of France

[73] Assignee: La Telemecanique Electrique, France

[21] Appl. No.: 10,526

[22] Filed: Feb. 3, 1987

[30] Foreign Application Priority Data

Feb. 5, 1986 [FR] France ................................ 86 01559

[51] Int. Cl.⁴ ............................................. H01R 13/64
[52] U.S. Cl. .................................................... 439/833

[58] Field of Search ......................... 439/819, 823, 833

[56] References Cited

U.S. PATENT DOCUMENTS 2,872,659  2/1959  Wills .................................... 439/819

Primary Examiner—Joseph H. McGlynn
Attorney, Agent, or Firm—William A. Drucker

[57] ABSTRACT

The invention provides a clip device for establishing a disconnectable electric connection between an omnibus bar and a fixed conducting knife. The clip is formed of two symmetrical flat conducting tongues disposed opposite each other and connected together by two compression springs. The clips are spaced apart and held apart from each other by a stirrup against which each of the legs of the clip bears in a double layer effect after unclipping thereof from the bar by translation.

7 Claims, 3 Drawing Sheets

4,776,817

DEVICE FOR ESTABLISHING A DISCONNECTABLE ELECTRIC CONNECTION BETWEEN A FIXED FLAT CONDUCTOR AND AN OMNIBUS BAR AND A CURRENT TAPPING AND DISCONNECTION BLOCK COMPRISING A PLURALITY OF SUCH DEVICES

BACKGROUND OF THE INVENTION

1. Field of the Invention

The present invention relates to a contact clip device for establishing a disconnectable electric connection between an omnibus bar of rectangular section, disposed flat or on edge, and a rigid flat conductor placed opposite the bar, in the same plane. It also relates to a current tapping and disconnection block associated with a set of distribution bars for electric switching apparatus and equipped with a plurality of these contact clips.

2. Description of the Prior Art

In connection with a current distribution system having parallel non coplanar omnibus bars, vertical for example, for switching apparatus, it is known to form each current tapping and disconnecting member in the form of a block molded from an insulating material having, on the one hand, a part movable in translation formed by a slide carrying conducting clips clippable on the distribution bars and unclippable therefrom and, on the other hand, a fixed part having conducting knives disposed on edge one of the ends of which is engaged between the two legs of the associated clip and the other end of which is fixed to associated means for connection to switching apparatus; the translational movement of the clip carrying slider is produced under the action of a control member for taking current from the bars and respectively disconnecting it.

Different clip structures of this kind are already known providing a disconnectable electric connection between an omnibus bar and a fixed flat conducting knife situated in the plane of the bar, at a distance therefrom. One of them is formed of two symmetrical flat conducting tongues disposed facing each other; these two tongues are housed and held in position in a through cavity formed in the insulating slider, which is disposed parallel to the bar and to the knife; this clip is further profiled so that in the clipped position one of its ends is engaged on the bar by forcing apart its legs against a resilient clamping force exerted by a compression spring connecting said legs together, whereas its other end is mounted for slidingly bearing against the knife while being subjected to a force exerted by an appropriate clamping member.

To pass from the clipped on position to the disconnected position, the slider is driven in translation so that one of the ends of the clip is separated from the bar by unclipping, whereas its other end held against the knife slides therealong; during this disconnecting movement, the clip moves then in translation over a total travel length which is equal to the sum of its travel for unclipping from the bar and the disconnecting travel properly speaking, this latter corresponding to a given distance separating the clip from the bar and being greater than the unclipping travel distance.

However, this type of double clip providing a disconnectable electric connection has drawbacks. In fact, since during the disconnecting movement, the clip moves in translation whilst slidingly bearing against the fixed knife, appreciable friction forces are therefore created on the knife, over the whole travel distance of the clip; thus, for a high number of clipping/unclipping operations, this pronounced friction results in rapid wear of the knife and damage to the associated contact.

SUMMARY OF THE INVENTION

The aim of the present invention is in particular to reduce the friction travel of this type of clip on the fixed knife during the connecting movement (or resetting movement) by translation of the clip, this friction occurring no longer over the whole travel of the clip as in the prior art but henceforth solely over its travel for clipping on (or unclipping from) the bar.

To this end, in accordance with the invention, in the contact clip of the above described type its two legs are spaced and held apart from each other by a stirrup against which they bear by pivoting caused by the action of a compression spring after unclipping thereof from the bar, so that in the disconnected position, the two legs of the clip are disposed on each side of the knife without cooperating therewith.

Thus, it will be readily understood that each leg of the clip forms a double lever having a common fulcrum formed by the stirrup, so that after being unclipped from the bar, the clip bears henceforth on the stirrup and is in stable equilibrium, without rubbing against the knife.

Another aim of the invention consists in reducing the friction force exerted on the knife during the unclipping travel of the clip during the disconnecting movement.

For this, according to a feature of the invention, the two legs of the clip are connected together by two compression springs which are disposed on each side of the stirrup and which are respectively associated with the two ends of the clip while exerting on each of them, only in the clipped position, the same contact pressure force.

According to another aspect of the invention, the two legs of the clip each have a dissymmetric profile with respect to the median plane of the stirrup; in this configuration, the two springs have different dimensional characteristics so that, after unclipping, the clip is in stable equilibrium without contact with the knife.

The invention also relates to a current tapping and disconnecting block associated with a set of distribution bars and equipped with a plurality of these improved clips of the above described type.

BRIEF DESCRIPTION OF THE DRAWINGS

Other features and advantages of the invention will be clearer from the detailed description which follows with reference to the accompanying drawings given solely by way of example and in which.

DESCRIPTION OF THE PREFERRED EMBODIMENT

Figure 1:
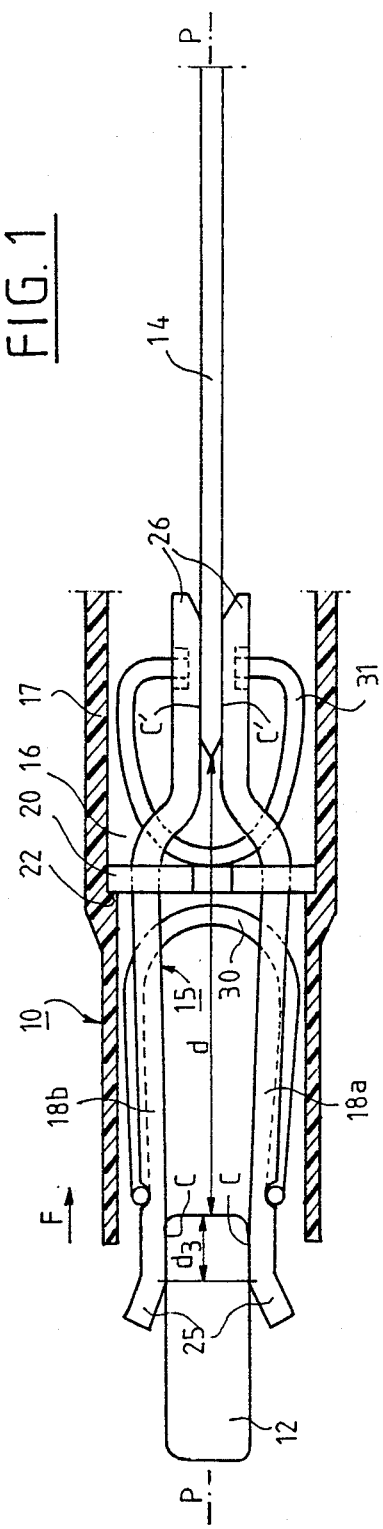
FIGS. 1 and 2 show a partial top view of the clip device of the invention, in the clipped position and respectively in the disconnected position.
Figure 2:
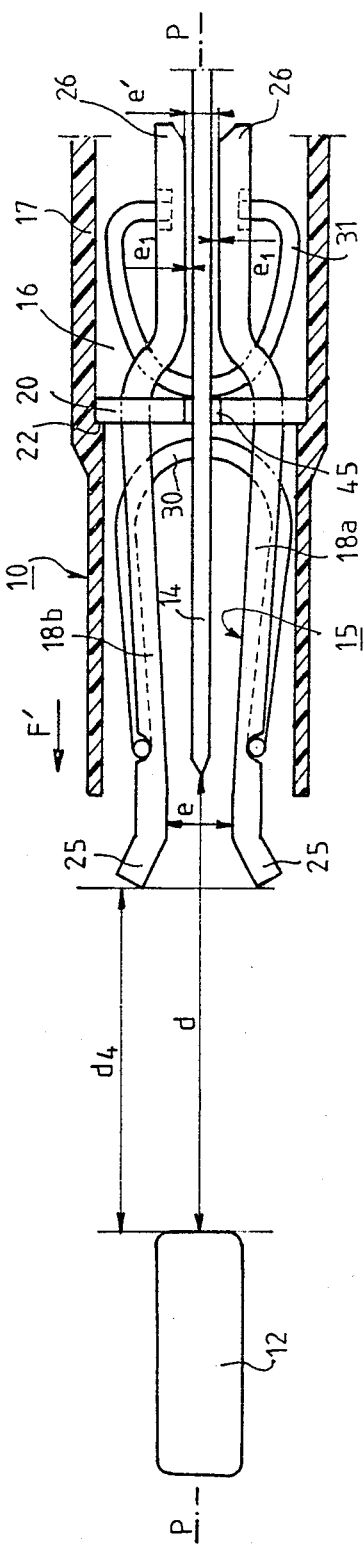

In FIGS. 1 and 2 there has been shown at 10 a conducting clip device of the invention adapted for establishing a disconnectable electric connection between a fixed omnibus bar 12 of rectangular cross section, disposd for example on edge, and a fixed flat conducting knife 14, made for example from silver coated copper, also disposed on edge and placed opposite the bar 12, in the same plane P—P at a given distance d therefrom.

It should be noted that the omnibus bar and the conducting knife may also be both disposed flat, without departing from the scope of the invention.

The connection device 10 is formed of an engageable clip referenced generally at 15 which is housed and held in position inside a through cavity 16 formed in a slide 17 made from an insulating material having a general tulip shape; as is clear from FIGS. 1 and 2, slide 17 is arranged parallel to the plane P—P and is able to move in translation in a direction parallel to this plane under the action of any control member (not shown) for passing from a clipped or engaged position (FIG. 1) to a disconnected position (FIG. 2) and vice versa.

Figure 3:
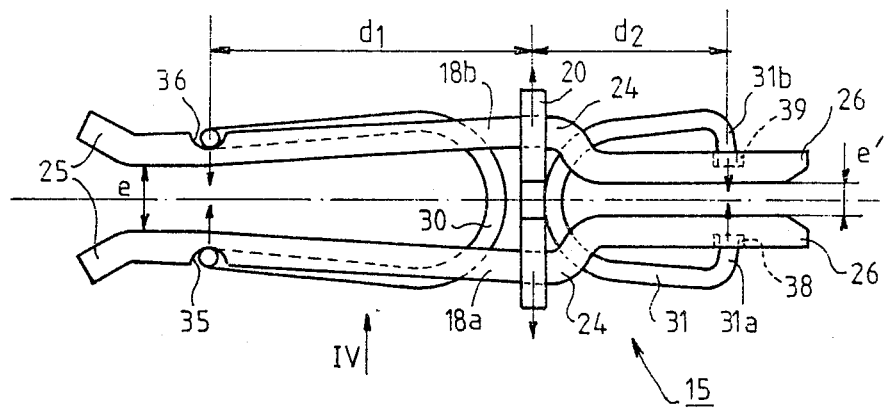
FIG. 3 shows a top view of the contact clip.

In a preferred embodiment illustrated in FIG. 3, the contact clip 15 has two flat symmetrical conducting tongues 18a and 18b, made for example from silver coated copper, disposed facing each other and held apart from each other by means of a spacer formed by a stirrup 20; in the chosen example of an on edge arrangement for the omnibus bar and conducting knife, as shown in FIGS. 1 and 2, the two spaced tongues 18a and 18b are also mounted on edge in the cavity of slider 17, which is provided inwardly with a shoulder 22 serving as abutment for the stirrup 20 of the clip during fitting thereof in the slider.

So as to reduce as much as possible the space required by the clip and the knife, on the one hand a knife is used whose thickness is chosen substantially less than that of the omnibus bar and, on the other hand, each of the two tongues 18a and 18b of the clip is profiled in a dissymmetrical manner with respect to the median plane of the stirrup 20; each leg 18a, 18b of the clip has, in the immediate vicinity of stirrup 20, a narrowed neck portion designated by the reference 24 in FIG. 3.

Furthermore, said clipping end of the clip, referenced at 25, is widened outwardly so as to facilitate engagement thereof by translation on the omnibus bar, whereas the other end of the clip, referenced at 26, is slightly chamfered.

As is clear from FIG. 3, the two legs 18a and 18b of the clip are connected together, advantageously, by two compression springs 30 and 31 which are disposed on each side of the stirrup 20 and which are associated respectively with the two ends 25 and 26 of the clip so as to exert on each of them, solely in the clipped on position (FIG. 1), the same contact pressure force.

Figure 4:
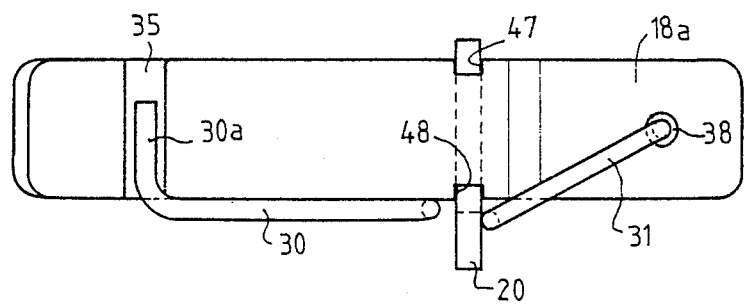
FIG. 4 shows a view along the arrow IV of FIG. 3.

In greater detail, with reference to FIG. 3 and FIG. 4, spring 30 is for example a resilient wire having a general U shape whose two ends each have an identical bent extension only one of which is visible at 30a in FIG. 4. These two bent extensions are engaged in two identical recesses 35 and 36 formed respectively in the external lateral surfaces of the two legs 18a and 18b of the clip, in the vicinity of the clipping end 25.

The other spring 31 is formed for example by another resilient wire also having a general U shape and whose two ends 31a and 31b (FIG. 3) are bent substantially at right angles towards each other and are held in abutment in two identical anchorage housings 38 and 39 formed respectively in the external lateral faces of the two legs 18a and 18b of the clip, in the vicinity of the other end 26.

In the on edge arrangement of the two legs of the clip, such as illustrated in FIGS. 3 and 4, the two loop shaped compression springs 30 and 31 are placed below these two legs.

Referring to FIG. 3 which illustrates the dissymmetrical clip in the rest condition, that is to say in stable equilibrium obtained for the disconnected position as will be seen further on, the two springs 30 and 31 are designed with different characteristics, not only in dimensions (section . . . ) but also in elasticity, determined so that the two spaced legs 18a and 18b of the clip have therebetween, on the one hand at the clipping end 25, a minimum predetermined spacing e slightly less than the thickness of the omnibus bar and, on the other hand, at the other end 26 a maximum spacing e' greater than the thickness of the knife.

Figure 5:
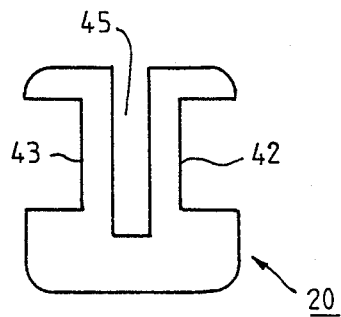
FIG. 5 shows the stirrup serving as spacer for the clip.

FIG. 5 shows the stirrup 20 spacing the two legs of the clip apart. This stirrup is formed of a rectangular conducting piece which is cut out so as to have, in cross section, two flat opposite lateral sides 42 and 43 having the shape of a U and disposed back to back by their bottoms, as well as a vertical central slit 45 opening at the top of the stirrup and having a width chosen to be greater than the thickness of the knife so as to allow passage thereof during the translational movement of the clip.

The two legs 18a and 18b of the clip are mounted on edge respectively in the two U shaped sides of the stirrup 20 while bearing thereon and are held in position by engagement of the two side arms of each U in two recesses 47 and 48 (FIG. 4) formed respectively in the upper and lower edges of the associated leg.

An important feature of the invention is that the two spaced legs 18a and 18b of the dissymmetrical clip described above each form two different lever arms having a common pivot formed by the stirrup 20 (FIG. 3), which thus serves as a means reversing the force resulting from the clamping forces exerted by the two different springs on each of these two lever arms. The stable equilibrium of the clip (FIG. 3) is thus obtained by placing the stirrup 20 at a distance $d_1$ determined conventionally, from the point of application of the force exerted by spring 30 on the clipping end, 25, and at a distance $d_2$, less than $d_1$, from the point of application of the force exerted by the spring 31 on the other end 26.

The use of the above described clip for providing a disconnectable electric connection between the omnibus bar and the conducting knife will now be explained with reference to FIGS. 1 and 2.

In FIG. 1 showing the electric connection formed between the omnibus bar 12 and the conducting knife 14, the contact clip 15 is engaged, at its clippable end 25, on the lateral sides of bar 12 by the forcing apart of its two legs 18a and 18b against the pressure exerted by spring 30; at C in FIG. 1 has been shown the electric contact zone of the clip engaged on the bar, this zone extending over a given clipping distance $d_3$. The other end 26 of the clip cooperates with knife 14 under the effect of the same clamping pressure exerted by spring 31; at C' in FIG. 1 has been shown the electric contact zone of the clip cooperating with the knife.

In this clipped position, FIG. 1, it will be noted that stirrup 20 is floating, that is to say that a slight clearance exists between its lateral sides and the internal lateral surfaces associated with the two legs of the clip.

By a translational movement of the clip carrying slider 17 in the unclipping direction shown by arrow F in FIG. 1, clip 15 can be separated from the omnibus bar 12, which causes, by the lever effect produced by the action of the springs and articulated on the stirrup 20, on the one hand the return to their minimum spacing e (FIG. 2) of the two legs of the clip at their end 25 and, on the other hand, the opening to the maximum spacing e' (FIG. 2) of said legs at their other end 26; thus, on unclipping at the end of travel $d_3$, the two legs 18a and 18b of the clip bear by pivoting against the lateral sides of the stirrup and therefore become separated from knife 14. At $e_1$ in FIG. 2 has been shown the clearance existing on each side of knife 14 at the end 26 of the clip after unclipping.

In this unclipped position, the clip is therefore in stable equilibrium, without friction on the knife 14.

Thus, continuing the translational movement of slider 17, the disengaged clip 15 comes into its disconnected position (FIG. 2) in which its end 25 is situated at a given disconnected distance $d_4$, greater than $d_3$ in the example illustrated in FIGS. 1 and 2, from the omnibus bar 12; during movement of the clip, the guide slit 45 (FIG. 2) formed in stirrup 20 allows the knife 14 to pass. When, after disconnection, it is desired to reengage the clip on the omnibus bar, the clip holding slider 17 is then driven in translation in the clipping direction shown by arrow F' in FIG. 2. By the double lever effect provided by each of the two legs of the clip, the clipping end 25 of the clip grips bar 12 by the forcing apart of its two legs 18a and 18b against the clamping force exerted by spring 30, whereas the other end 26 of the clip grips knife 14 by the drawing together of said legs subjected to the same clamping force exerted by spring 31, as illustrated in FIG. 1.

Figure 6:
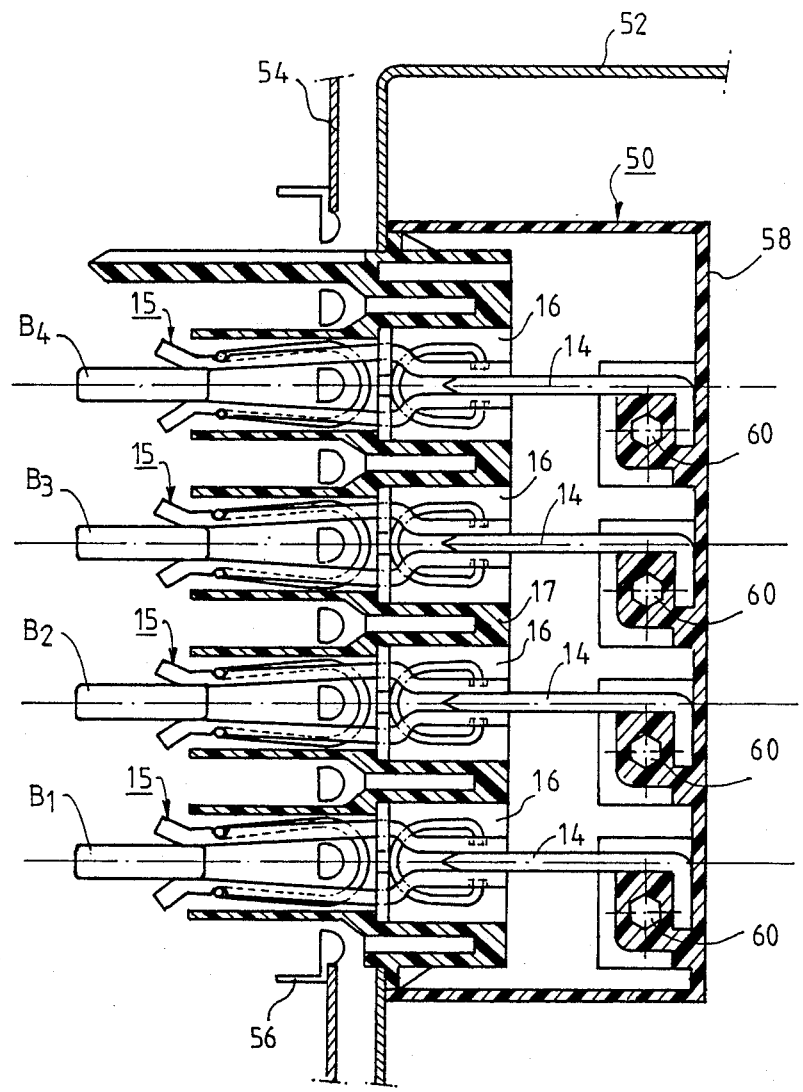
FIG. 6 shows a partial top view in section of a distribution bar column associated with a current tapping and disconnecting block equipped with a multiple clip device in accordance with the invention, this latter being illustrated in the position clipped on the bars.

In FIG. 6 there has been shown at 50 a current tapping and disconnecting member with multiple identical clips, each of them being of the above described type, which is used in a system for distributing electric current from a set of parallel non coplanar omnibus bars; such a current tapping and disconnecting member is arranged between said set of bars and switching apparatus such for example as contact markers, contact breakers, reverse current relays or switches properly speaking, with which are possibly associated auxiliary devices such as auxiliary protective, fuse devices or remote control devices.

The omnibus distribution bars illustrated in FIG. 6 are disposed for example vertically and are for example four in number ($B_1$-$B_4$) corresponding in this case to the conductors of an electric three phase network with neutral; of course, the bars may be more or less in number.

The current tapping and disconnecting member 50 is a molded block of an insulating material, generally substantially parallelepipedic in shape, which is fixed to a fixed part 52 of a support applied laterally against a vertical side 54 of a protective casing disposed about the bars.

Block 50 is equiped with current tapping clips 15, four in number in the chosen example, which are engaged on the associated bars $B_1$-$B_4$ by introduction through a trap 56 provided in the side 54 of the casing perpendicular to the planes of the bars.

The clip carrying slider 17, movable in translation, is also in the form of a parallelepipedic block of molded insulating material and has a plurality of through cavities 16, four in number in the chosen example, formed side by side parallel to the planes of the bars; the clips 15 are permanently housed in these cavities associated with the slider, which is controlled by a fixed rotary shaft (not shown) whose axis extends in a direction perpendicular to the direction of movement of the slider. The rotary shaft is itself actuated by a control member (not shown) of manual or other type.

The translational movement of the slider is controlled in response to the rotation of the shaft through an appropriate movement transformation means, of the rack and pinion type for example.

Block 50, FIG. 6, also has a fixed part 58 which carries, on the one hand, the rotary shaft controlling the slider and, on the other, fixed means for electric connection for example by means of screws 60 with power terminals of the associated switching apparatus (not shown); each terminal 60 is connected electrically to the associated clip 15 by means of the conducting knife 14 one of whose ends is fixed in terminal 60 and the other end of which is engaged between the two contacts of clip 15. In FIG. 6, the current tapping and disconnection block 50 is shown in the clipped on position.

The disconnection operations by unclipping the clips and the reclipping operations are carried out identically to those described above in relation with a single clip shown in FIGS. 1 and 2.

Of course, the invention is in no wise limited to the embodiment described and shown and includes all the technical equivalents of the means described, as well as combinations thereof if they are effected within the spirit of the invention and used within the scope the following claims.

What is claimed is:

1. A device for establishing a disconnectable electric connexion between a fixed flat conductor which extends in a plane and a fixed omnibus bar which extends in the said plane, in front of the flat conductor, said device comprising:
   i—an insulating piece movable in translation along a trajectory parallel to said plane;
   ii—a stirrup fixedly connected to said insulating piece and having first and second edges symmetrically disposed with respect to said plane;
   iii—a double contact clip comprising a first tongue having a first and a second end portions, and between these first and second end portions, a first intermediate portion which can bear on the said first edge so as to allow a rocking movement of this first tongue about the said first edge, and a second tongue having third and fourth end portions, and between these third and fourth end portions, a second intermediate portion which can bear on the said second edge so as to allow a rocking movement of this second tongue about the second edge, said first end portion facing said third end portion so as to form a first clip structure, wherein the fixed flat conductor is introduced, and said second end portion facing said fourth end portion so as to form a second clip structure, wherein the omnibus bar can be engaged;
   iv—spring means acting on said tongues so as to apply the first and second intermediate portions respectively applied against said first and second edges;
   v—means for translating said insulating piece in a determined direction between a connection position in which said fixed flat conductor and said omnibus bar are respectively engaged in the said first and second clip structures and hold apart the tongues from each other and from the said edges of the stirrup against the action of the spring means, and a disconnection position, wherein the second clip structure is separated from the omnibus bar by unclipping while the stirrup maintains said tongues spaced apart and held apart from each other and from the fixed flat conductor which remains introduced in the first clip structure.

2. The device as claimed in claim 1, wherein in the disconnected position, said second and said fourth end portions are spaced therebetween by a first distance which is less than the thickness of the omnibus bar and said first and said third end portions are spaced therebetween by a second distance which is greater than the thickness of the fixed flat conductor.

3. The device as claimed in claim 1, wherein said stirrup is a stamped piece having two flat opposite portions each being provided with a substantially rectangular cavity having a bottom which constitutes one of said edges.

4. The device as claimed in claim 1, wherein said fixed flat conductor has a longitudinal axis which extends parallel to the trajectory of the insulating piece and said stirrup has a central guide slit perpendicular to this trajectory for allowing passage of the fixed flat conductor during the translational movement of the insulating piece.

5. The device as claimed in claim 1, wherein said second and said fourth portions have flared extremities so as to facilitate engagement of the second clip structure on the omnibus bar.

6. The device as claimed in claim 1, wherein said spring means comprise first and second compression springs which are disposed on each side of the stirrup, said first compression spring acting on said first and said third end portions which form the first clip structure and said second compression spring acting on said second and said fourth end portions which form the second clip structure, said first and second compression springs exerting respectively on said first and said second clip structures an identical contact pressure force, only in the connection position.

7. The device as claimed in claim 6, wherein each of said springs is formed by a U-shaped resilient wire, said first spring having two ends respectively provided with two bent extensions which extend substantially at right angle towards each other and are retained in two anchoring housings formed respectively in said first and said third end portions, and the said second spring having two ends respectively provided with two bent extensions which extend parallel to each other and which are engaged in two respective recesses formed respectively in the second and the fourth end portions.

* * * * *